Nov. 3, 1970  J. LUDEMANN ET AL  3,538,360
HYSTERESIS MOTOR

Filed Oct. 21, 1968  2 Sheets-Sheet 1

Inventors:
Joseph Ludemann
Heinz Heilmann
By: Spencer & Kaye
Attorneys

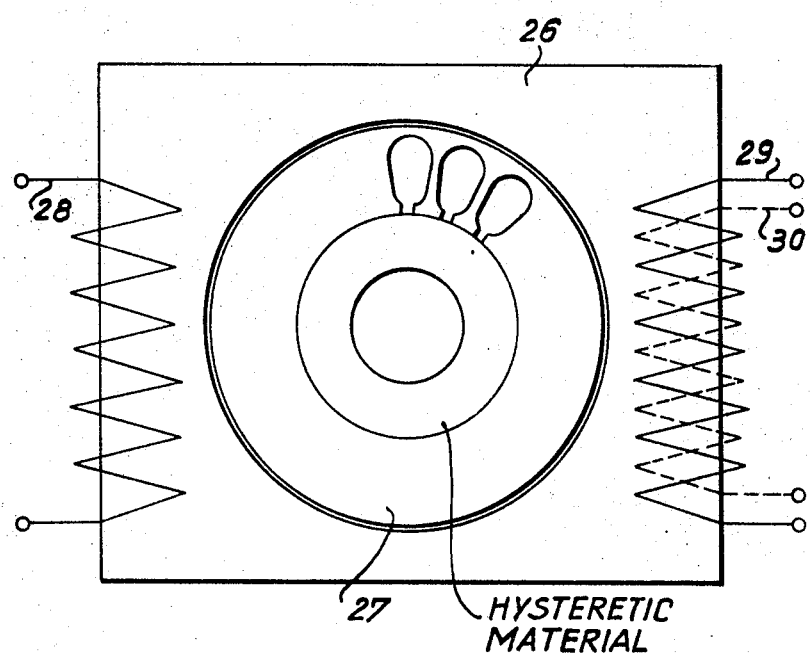

United States Patent Office 3,538,360
Patented Nov. 3, 1970

3,538,360
HYSTERESIS MOTOR
Joseph Ludemann and Heinz Heilmann, Oldenburg, Germany, assignors to Licentia Patent-Verwaltungs-G.m.b.H., Frankfurt, Germany
Filed Oct. 21, 1968, Ser. No. 769,308
Claims priority, application Germany, Oct. 20, 1967, 1,638,418; Nov. 30, 1967, 1,638,429
Int. Cl. H02k 37/00
U.S. Cl. 310—46                     14 Claims

ABSTRACT OF THE DISCLOSURE

A hysteresis motor having an improved rotor formed from a lamination packet of conventional dynamo sheet iron and a yoke formed at least from some hysteretic material. The lamination packet, which is adjacent to or faces the motor air-gap, is provided with grooves for receiving a squirrel cage. A number of different embodiments of the grooves in the lamination packet, and of the yoke are disclosed. For example, the grooves may be magnetically opened in a direction facing the air-gap or the yoke, while the yoke may be formed entirely of hysteretic material or by providing rods of hysteretic material within arcuate cut-outs formed in the dynamo sheet iron laminations.

BACKGROUND OF THE INVENTION

The present invention relates to synchronous motors and most particularly to a small synchronous motor having a rotor formed at least in part of hysteretic material and provided with a squirrel cage.

In hysteresis motors it is known, in order to improve the starting characteristics and in order to avoid heavy oscillations under intermittent loads to provide the rotor with a squirrel cage portion which is disposed in the grooves of a portion of the rotor having conventional laminations. The rotor thus consists of two differently constructed portions which can be arranged in different ways with respect to each other.

In one such arrangement known, two axially adjacent portions are combined in the rotor. One of these portions is in the form of a hysteretic material and the other portion is in the form of a squirrel cage rotor of conventional construction. This arrangement corresponds to a magnetic parallel connection. Such an embodiment has the drawback of poor utilization of the axial length of the rotor, particularly since a certain spacing is required between the two rotor portions to house the short-circuit ings of the squirrel cage rotor. Moreover, the squirrel cage rotor portion here exhibits a soft speed characteristic, due to its short structural length, thus making the coming-into-step of the motor more difficult. In such an arrangement strong magnetic forces act on the rotor in the direction of the motor axis thus requiring a very expensive bearing arrangement.

In another known hysteresis motor arrangement, the two rotor portions are arranged concentrically one on top of the other, the hysteretic material facing the air gap between the rotor and the stator. In such an embodiment, the characteristics of the motor are substantially determined by the selection of the radial thickness of the hysteretic material. This has some significant disadvantages. For instance, if a relatively thick outer hysteresis cylinder is used (in which case the so-called rotational hysteresis generally occurs) the desired effects of the squirrel cage, such as providing asynchronous starting moments and damping the rotor oscillations, are greatly reduced. This is due to the relatively great distance between the squirrel cage core and the air gap. A substantial segment of this arrangement corresponds to a magnetic parallel connection due to the fact that the magnetic flux flows in substantially parallel directions through the hysteretic material and through the laminations of the rotor. If, on the other hand, the hysteresis cylinder is relatively thin, a predominantly magnetic series connection results between the hysteretic material and the laminations. In the latter case, however, the volume of the hysteretic material is substantially reduced. Furthermore, the hysteretic material is not fully utilized and the so-called alternating hysteresis results. Thus, the compromise, which must necessarily be made, between the desired effects and the undesirable side effects, requires great precision in manufacturing the hysteresis cylinder with respect to its thickness. Otherwise motors result which have very wide variations in operating characteristics.

According to the German Pat. No. 741,352 issued Nov. 10, 1943, and the German published patent application Ser. No. 1,166,347 filed Jan. 25, 1963, it is known to surround permanent-magnet rotors with a cylindrical ring of laminations which face the air gap and which hold the starting cage. Such starting cage is formed of short-circuited winding rods. Since synchronous motors with permanent-magnet rotors, unlike hysteresis motors, do not start up by themselves, a starting cage is absolutely necessary. Thus, permanent-magnet-type motors are designed to achieve a desired mechanical stability of the rotor and, at the same time, a better utilization of the starting cage. However, embodiments of this type, are not known for hysteresis-type self-starting magnetic rotor motors.

Accordingly, it would be desirable to construct a hysteresis-type magnetic rotor motor in such a manner that it would have the operating characteristics of producing high asynchronous torque moments, during the starting stage, and after the completion of the starting stage, synchronous revolutions of the rotor as it continues to run. After the synchronous speed is reached, damaging rotor oscillations must also be eliminated. A motor having such characteristics would be particularly well suited to drive high quality sound instruments, particularly those with tape-type sound carriers.

In order to meet the increased quality (e.g. the so-called "Hi-Fi" quality) requirements of sound instruments, it has been the practice to construct them with two motors. These two motors include a synchronously operating drive motor and a specially constructed, asynchronous motor to rewind the sound carrier. A special transformer is also required to feed the electronic components with low or high voltages. Thus constructed, a considerable amount of space is taken up in the instruments. In addition, the weight of the instrument is substantially increased as well as the cost of producing the instrument. The present invention teaches a way of eliminating the two motors required by prior art sound instrument constructions. The present invention combines the required characteristics of the two motors, the sound motor and the rewind motor, into one.

Moreover, it is known in the construction of relatively smaller electromotor-driven instruments that, to eliminate the need for a special transformer, the drive motors, preferably constructed as shaded-pole motors, are provided with a transformer-type additional winding on their stators. Thus constructed, the magnetic circuit of the motor also acts as the magnetic circuit of a transformer which can take over the current supply for the electronic components of the instrument (German published patent application No. 1,225,889 filed Jan. 30, 1963). The arrangement of such an additional winding on the stators of prior art hysteresis motors like the one described above in which the rotor of each motor is provided with a hysteretic portion disposed directly at the air gap, has thus far not proven to be advisable. The reasons for this are that the currents flowing in such secondary transformer-type additional windings often deviate considerably from the sine shape or an unsymmetrical arrangement of these additional windings causes unsymmetrical pole loads to occur. As a consequence of the additional stresses from torque created by such additional currents, the motors fall out of step and do not operate at a constant speed. This fact is responsible for the prior art assumption that hysteresis motors could not be provided transformer-type additional windings on their stators. The present invention, however, describes an arrangement which establishes that this can be done.

SUMMARY OF THE INVENTION

It is therefore an object of the present invention to construct a hysteresis motor in such a manner that high asynchronous torque moments are produced during motor starting and, after starting, the motor continues to run synchronously and without rotor oscillations.

It is a further object of the present invention to use the stator laminations of hysteresis motors as the magnetic circuit for an additional winding which serves as a transformer.

According to one preferred embodiment of the present invention the rotor includes a yoke of hysteretic material. The yoke is surrounded, on its side facing the air gap, by a lamination packet of dynamo sheet iron which holds the squirrel cage. Thus the magnetic flux permeating the rotor is forced to close in its entirety through the hysteretic material, after it flows radially through the portion of the rotor formed of the dynamo sheet iron.

According to an advantageous further development of the present invention, the rotor consists of laminations which are cut out of hysteresis sheets and provided with grooves. In this arrangement, too, the rotor yoke consists entirely of hysteretic material and is positively permeated by the entire useful magnetic flux.

According to another advantageous further development of the present invention, the rotor laminations are layers of dynamo sheet iron out of which a plurality of recesses in the form of arcuate sectors are cut to hold the profiled hysteretic material. This embodiment is distinguished by a particularly advantageous and economical production method. The rotor yoke here mainly consists of hysteretic material which is also positively permeated by virtually the entire useful magnetic flux. In addition, the arrangement of the hysteretic material results in an intended reluctance effect in the rotor.

Finally, according to a further advantageous development of the present invention, the stator of the motor which surrounds the rotor is provided with at least one additional winding which acts as a transformer.

BRIEF DESCRIPTION OF THE DRAWINGS

FIG. 7 is a view of a rotor mounted in a stator provided with a transformer-type additional winding according to the present invention.

DESCRIPTION OF THE PREFERRED EMBODIMENT

Figure 1:
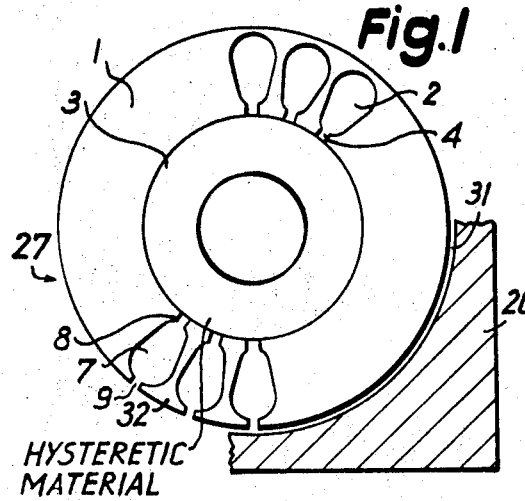
FIG. 1 is a sectional view of a rotor and a portion of a stator according to a preferred embodiment of the present invention.

FIG. 1 is a section through a portion of a stator 26 and a rotor 27 provided with two concentrically disposed portions which together form a short-circuit or squirrel cage carrying means. The first portion of such means is a lamination packet 1 facing the air gap 31. The lamination packet 1 includes annular laminations of dynamo sheet iron provided with grooves 2 arranged in the form of a ring for receiving and holding the squirrel cage (not shown). The lamination packet 1 surrounds a yoke in the form of a cylinder 3 of hysteresis material. The yoke formed by cylinder 3 is provided inside the ring formed by the squirrel cage attached to the grooves 2. As shown, the grooves 2 are magnetically open toward the direction of cylinder 3 by way of slits 4 (i.e., the transverse magnetic fluxes substantially depend on the configuration of the groove at this point and, in an extreme case, can be practically eliminated by selecting the width of the slit to be equal to the width of the groove).

FIG. 1 also shows a further type of groove 7 which is magnetically open on both sides by way of slits 8 and 9, respectively (i.e., on the side toward the hysteresis cylinder 3 as well as on the side toward the air gap 31). Such a rotor can be produced, for example, by first cutting the sheets to have a piece (not shown) bridging the slits 9 and thus to be of a somewhat larger diameter. After casting the short-circuit cage into grooves 2, the rotor is so turned that the piece at the slit 9 is eliminated and the individual lamination packet sections 32 are separated from each other. Thus, individual magnetically separated segments 32 are produced on the side of the rotor which faces the air gap 31, permitting a magnetic flux in the laminated portion of the rotor, only in a radial direction. This assures the formation of the desired magnetic series connection.

In any case, therefore, the rotor yoke, according to the present invention is formed of hysteretic material, which is optimally utilized, since it is positively permeated by the entire useful magnetic flux. This is particularly significant in small motors which have a limited magnetic potential circulation. Moreover, the lamination pocket 1, having the short-circuit cage, faces the air gap 31 and is so constructed that the magnetic flux here is substantially radial. Thus, tangential transverse fluxes are avoided as much as possible. This is accomplished by providing openings such as slits 4, or 8 and 9, respectively, or, where there are closed grooves, by dispersal bars. The short circuit or squirrel cage disposed, in any case, at the air gap 31 assures correspondingly high asynchronous torques and a definite damping of the damaging rotational oscillations during sudden changes in load in synchronous operation.

Figure 2:
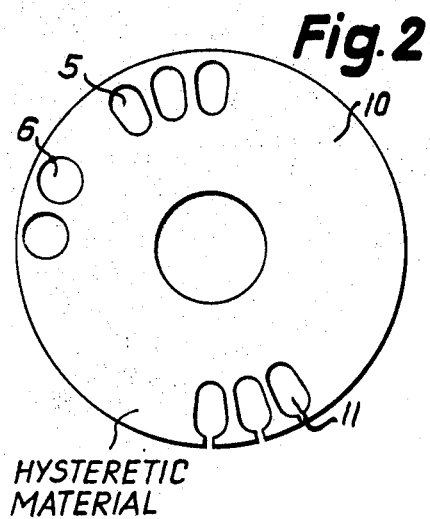
FIG. 2 is a sectional view of a rotor according to another preferred embodiment of the present invention.

FIG. 2 illustrates another rotor arrangement of hysteretic material with a short-circuit cage to improve the starting characteristics. Here the rotor is formed of laminations 10 in the usual manner. However, the individual laminations 10 are made of hysteresis sheet iron and holding a squirrel cage (not shown). The grooves and are provided with grooves 5, 6 or 11, for receiving and holding a squirrel cage (not shown). The grooves 5, 6 or 11 are selected to have different shapes, as indicated.

Hysteresis materials are manufactured today in the form of stampable sheet metals. Thus it is possible generally to manufacture rotor laminations with grooves for a squirrel cage from this material in a manner similar to the manufacture of rotor laminations with grooves for a squirrel cage from dynamo sheet iron. The shape and number of the grooves must, of course, be adapted to the stamping method which is more difficult than that for the normal dynamo sheet iron. A rotor thus manufactured also encompasses the concept of the present invention; namely, that the rotor yoke consist of hysteretic material and be positively permeated by the entire useful flux.

Figure 3:
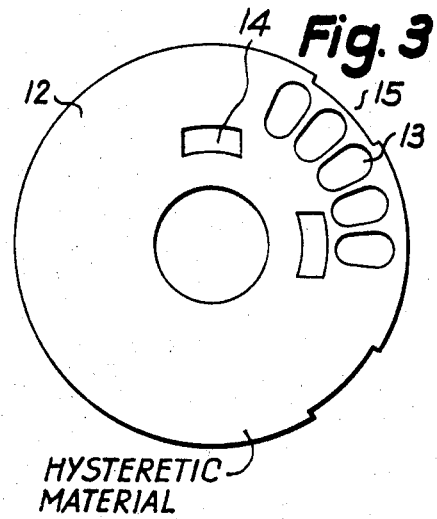
FIG. 3 is a variation of the rotor shown in FIG. 2 in which narrow passages are provided to produce a reluctance effect.

FIG. 3 shows a rotor arrangement having hysteretic laminations 12. The sheets 12 are provided, in addition to the grooves 13 for receiving and holding a squirrel cage (not shown), with magnetic narrow passages 14 and cutting out the rotor sheets. These cutouts 14 and 15, 15, respectively, produced by a process of stamping or can have the shapes as shown in FIG. 3.

By providing these narrow passages 14 and 15, the falling out of synchronization moment of the motor can be augmented by an additional reluctance effect. There are a number of further possibilities to achieve this result in this combined rotor, such as, for example, providing certain configurations of grooves, a special configuration of the rotor yoke consisting of hysteretic material, and other similar features. The most significant embodiments will be described in detail with the aid of the remaining figures.

The starting cage for the rotors shown in FIGS. 2 and 3 is produced in the conventional manner, for example, from cast aluminum.

Figure 4:
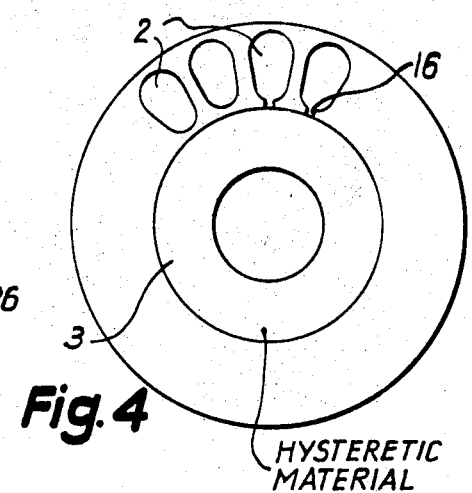
FIG. 4 is a variation of the rotor shown in FIG. 1 in which a reluctance effect is created by combining a variety of open and closed grooves.

FIG. 4 shows how a reluctance effect can also be achieved in a rotor arrangement according to FIG. 1. This is accomplished by providing groups of grooves 2 with slits 16 and other groups without such slits. By this arrangement, groups of grooves 2 are provided which correspond to the number of poles in the rotor.

Figure 5:
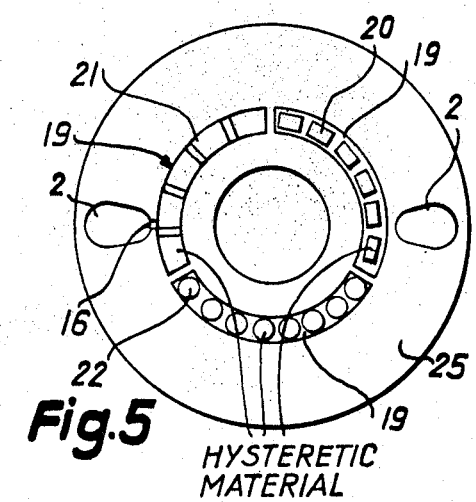
FIG. 5 shows a sectional view of a rotor according to yet another embodiment of the present invention.

FIG. 5 shows a rotor arrangement having laminations of dynamo sheet iron 25. The yoke in FIG. 5 includes a hysteresis ring having individual profiled hysteresis pieces or rods. The recesses 19 are provided in the laminations of dynamo sheet iron in the form of cut-outs and the profile hysteresis rods 20, 21 or 22, respectively, are inserted into such recesses. This embodiment is particularly easy to manufacture. The profiled rods 20 as shown have a rectangular cross section and are inserted into the recess 19, and are arranged in a series. The profiled rods 21 as shown have a trapezoidal cross section whose two longitudinal sides conform to the radii of the corresponding arcuate sides of recess 19. The profile rods 22, as can be seen, have a circular cross section.

Figure 6:
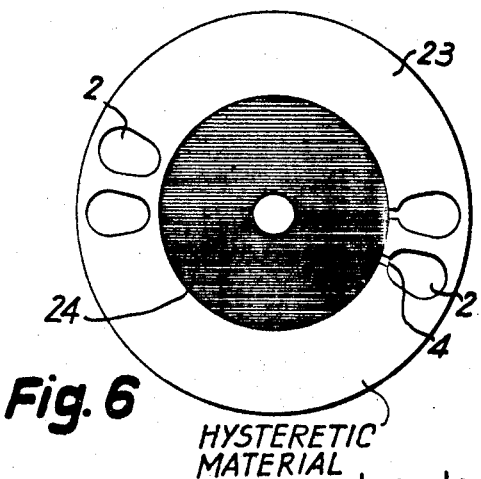
FIG. 6 shows a sectional view of a rotor according to still another embodiment of the present invention.

FIG. 6 shows a rotor lamination 23 in which the yoke includes a portion 24 formed of hysteretic material and having preferred magnetic direction. This can be achieved, for example, by laminating the hysteresis sheets perpendicularly to the motor axis or by means of normally laminated, anisotropic hysteresis sheets. The portion 24 can be provided with a shape which deviates from the conventional round shape. For example, portion 24 can be square. A square shape would, of course, facilitate the mechanical production of the rotors, since the laminations, themselves, are perpendicularly disposed.

FIG. 7 illustrates the principle of a wound stator. The rotor 27 is mounted for rotation within the stator 26. The rotor 27 is constructed according to the embodiments shown in FIGS. 1 through 6. The two poles of the stator 26 are provided the working windings 28 and 29, respectively. The additional winding 30, shown as a dot-dash line, is further applied at one pole of the stator 26. The currents, which flow through the additional winding of the illustrated arrangement, cause additional magnetic according to the invention, as illustrated in any one of fluxes in the stator laminations. By constructing the rotor FIGS. 1 through 6, its synchronous rotation is only very slightly interfered with as a result of the additional winding 30. The main reason for this favorable operating characteristic is due to the fact that the hysteretic material is provided only in the yoke of the rotor; whereas the portion of the rotor surrounding the yoke portion, namely, the lamination packet, which faces the air gap and holds the short-circuit cage, is formed of normal dynamo sheet iron. Thus the lamination packet is able to serve as an effective buffer zone. The additionally produced magnetic fields are damped before reaching the lamination packet of the rotor to such an extent that they can hardly influence the yoke portion of the rotor which is formed of hysteretic material. The short-circuit cage has a similar damping effect as the tertiary winding of a transformer.

The embodiments shown in FIGS. 1 through 7 are directed as illustrated, to a motor with an internal rotor. These embodiments, of course, are alternatively also suited for use with external-rotor or disc-rotor motors.

The arrangement according to the present invention has the advantage that the short-circuit cage is disposed directly at the air gap and, as a consequence, high asynchronous torques are produced. Moreover, excellent damping of damaging rotor oscillations is effected after the synchronous speed is reached. The essential aspect of the present invention, as depicted in all of the illustrated embodiments, is in providing the yoke of the rotor with hysteretic material. As a result of this, the useful flux permeating the rotor must also flow through the hysteretic material. This arrangement results in a predominantly series connection between the normal dynamo sheet iron and the hysteretic material through which the magnetic flux flows. Thus, a magnetic flux through the dynamo sheet metal flowing parallel to this series connection is substantially eliminated.

The internally disposed hysteresis cylinder as in FIG. 1, does not require great precision in its production since the cylinder which is to contain the short-circuit cake is pulled thereover. The latter can be more easily worked and can be more easily set to the required air gap tolerance between the rotor and he stator. The rotor arrangement according to the present invention, utilizes the hysteretic material in an optimum manner thus reducing the amount of material required.

The present invention has the further advantage that it alllows an additional transformer-type winding to be applied to the stator of a hysteresis motor without impairing its synchronously rotating operational characteristic. The rotors of such motors are provided, at least partially, with hysteretic material. A motor, constructed in accordance with the teachings of the present invention can be used in a particularly advantageous manner in sound instruments. In instruments of this type, the use of a motor, according to the present invention, makes possible the elimination of the rewind motor and of the supply transformer.

It will be understood that the above description of the present invention is susceptible to various modifications, changes and adaptations.

What is claimed is:

1. An electromotor comprising in combination:
   (a) a stator,
   (b) a rotor mounted in said stator, said rotor and stator together defining an air-gap therebetween, said rotor including a squirrel cage, a lamination packet formed from dynamo sheet iron, and an additional portion formed from hysteretic material which effects the synchronous speed of said rotor,
      said lamination packet facing said air-gap and carrying said squirrel cage, and
      said hysteretic material portion being within said squirrel cage and constituting an inner yoke for said lamination packet.

2. Electromotor as defined in claim 1 wherein said lamination packet is provided with a plurality of grooves for receiving said squirrel cage, each of said grooves being magnetically closed in the direction toward the air gap and magnetically open in the direction of the yoke.

3. Electromotor as defined in claim 1 wherein the lamination packet is provided with a plurality of grooves for receiving said squirrel cage, each of said grooves being magnetically open in the direction toward the air gap, said opening being defined by a slit extending radially with respect to the rotor axis.

4. Electromotor as defined in claim 1 wherein the lamination packet is provided with a plurality of grooves for receiving said squirrel cage and each of said gooves is magnetically open both in the direction toward the yoke and in the direction toward the air gap, said opening being defined by a slit extending radially from said groove with respect to the motor axis.

5. Electromotor as defined in claim 4 wherein said slits and grooves together define a plurality of magnetically separated laminated segments in the lamination packet.

6. Electromotor as defined in claim 1 wherein said hysteretic material in said yoke is in the form of a stack of hysteresis sheet iron laminations which are arranged parallel to the rotor axis.

7. Electromotor as defined in claim 1 wherein said lamination packet is provided with a plurality of grooves for receiving said squirrel cake, some of said grooves being provided with magnetic openings, and said grooves being arranged in groups of magnetically open grooves alternating with groups of magnetically closed grooves, said groups of grooves being provided in a number corresponding to the number of poles in said rotor.

8. Electromotor as defined in claim 1 wherein relatively narrow magnetic passages are provided in said dynamos sheet iron laminations, thereby to produce reluctance effects.

9. Electromotor as defined in claim 8 wherein said magnetic passages are provided in both said lamination packet and said yoke portion.

10. Electromotor as defined in claim 1 wherein the stator of the motor includes two poles and a transformer-type winding at each of said poles and at least one additional transformer-type winding at one of said poles.

11. Electromotor as defined in claim 1 wherein said hysteretic material is characterized by having a preferred direction of magnetization, said hysteretic material being oriented in a corresponding direction in said yoke, as a consequence of which magnetic anisotropic properties are effected in said yoke.

12. An electromotor comprising in combination:
 (a) a stator,
 (b) a rotor mounted in said stator, said rotor and stator together defining an air-gap therebetween, said rotor including a squirrel cage and means fo carrying the squirrel cage, said squirrel cage carrying means having:
  (1) a lamination packet facing said air-gap, said squirrel cage being attached in the form of a ring to said packet; and
  (2) a portion constituting a yoke inside said squirrel cage, said yoke portion being formed of dynamo sheet iron laminations, a plurality of arcuate sectors being provided in said yoke portion, said sectors being cut-outs from said dynamo sheet iron laminations and said sectors having profiled segments of hysteretic material disposed therein.

13. Electromotor as defined in claim 12 wherein said lamination packet is formed of dynamo sheet iron.

14. Electromotor as defined in claim 12 wherein said hysteretic material segments are characterized by having a preferred direction, said hysteretic material being oriented in a corresponding direction in said sectors of the yoke portion, as a consequence of which magnetic anisotropic properties are effected in the yoke portion.

References Cited

UNITED STATES PATENTS

| | | | |
|---|---|---|---|
| 2,183,404 | 12/1939 | Morrill | 310—163 |
| 2,454,026 | 11/1948 | Bacon | 310—163 |
| 2,871,384 | 1/1959 | Gabriel | 310—162 |
| 2,899,618 | 8/1959 | Noodleman | 310—212 |
| 3,054,009 | 9/1962 | Papst | 310—163 |
| 3,068,374 | 12/1962 | Bekey | 310—162 |

MILTON O. HIRSHFIELD, Primary Examiner

R. SKUDY, Assistant Examiner

U.S. Cl. X.R.

310—163, 211, 261